Aug. 5, 1969     T. SCHMIDT     3,459,414

HEAT-TREATMENT APPARATUS

Filed April 14, 1966

Theodor Schmidt
INVENTOR.

BY Karl F. Ross
Attorney

United States Patent Office 3,459,414
Patented Aug. 5, 1969

3,459,414
HEAT-TREATMENT APPARATUS
Theodor Schmidt, Essen, Germany, assignor to Firma Indugas Gesellschaft fur industrielle Gasverwendung m.b.H., Essen, Germany, a corporation of Germany
Filed Apr. 14, 1966, Ser. No. 542,611
Claims priority, application Germany, Apr. 17, 1965, J 27,944
Int. Cl. C21c 1/08, 1/12
U.S. Cl. 266—5    3 Claims

ABSTRACT OF THE DISCLOSURE

An apparatus for and a method of heat-treating elongated cylindrical metalic bodies positioned along an upright axis wherein, at a plurality of vertically spaced locations, a plurality of flame jets are directed toward the body at angles greater than the tangential but not yet radial, the jets being so arranged that the gases within an annular space surrounding the body spiral inwardly with a velocity inversely proportional to the distance of the region of gas flow from the axis.

---

Figure 1:
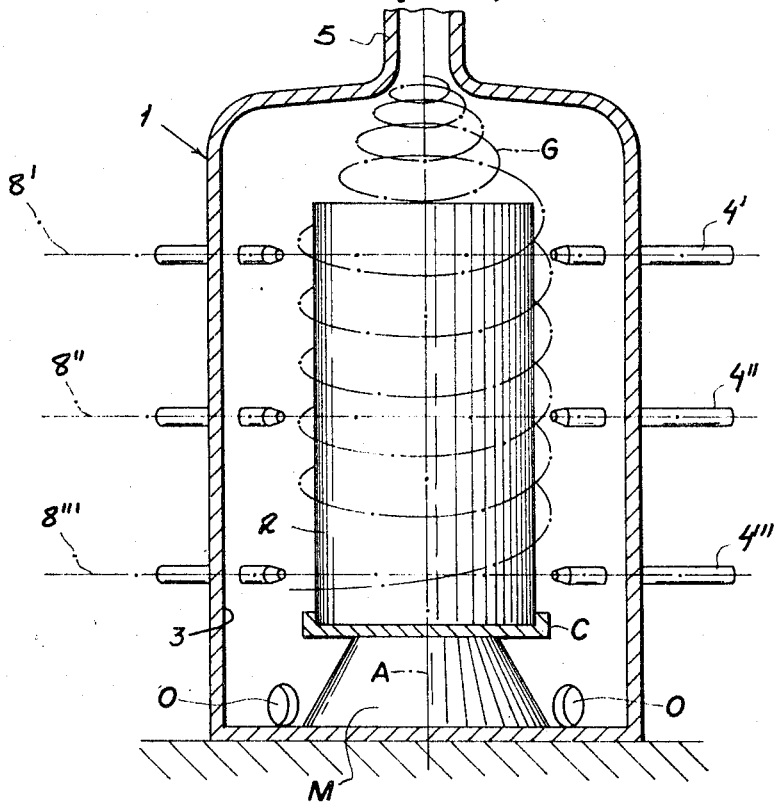

My present invention relates to a heat-treatment apparatus and, more particularly, to a furnace or device for the convective heat treatment of cylindrical ingots, billets, blocks and other solid or tubular bodies of generally cylindrical configuration.

The heat treatment of blocks (i.e. solid bodies), billets and the like of various axially symmetrical configurations has been proposed heretofore and, indeed, various devices are provided for this purpose. In general, such devices can be subdivided into two classes, namely, devices operating by radiant heating of the bodies and convective-heating arrangements. While radiant-heating systems are highly effective for the rapid heating of such bodies, the devices using the system are highly expensive and, moreover, the energy cost is so considerable as to render radiant-heating techniques practically incapable of economic realization on a large scale. For the most part, therefore, radiant-heating systems have been confined to laboratories and metallurgical plants in which the bodies are relatively small or of considerable value. It has, consequently, long been an object in the metallurgical field to provide an economical method and device for the convective heat-treatment of cylindrical bodies or tubes (e.g. of steel). In fact, a variety of systems have been proposed along these lines, some of which make us of cylindrical heat-treatment chambers which have upright axes and are substantially coaxial or concentric with the body or block to be subjected to heat treatment. Burners open into this chamber and are either directed against the body in a radial line so that an intense heating of the body is developed directly opposite the mouth of the burner, or oriented tangentially so as to create a vortex of gases swirling around the body and heating the latter by contact with the gases. This latter system, while resulting in a substantially more uniform heating of the body, is characterized by relatively poor heat transfer from the swirling ambient gases to the metalic body. As a consequence, rapid heating of the body is more or less impossible. Thus, when convective heating arrangements have been proposed, they either have resulted in a direct overheating of certain portions of the metallic body by subjecting them to a blast of exhaust gases and flame from the burner along a radius of the burner chamber and the body, or have been so slow as to be economically ineffective.

It is, accordingly, the principal object of the present invention to provide an improved method of treating metallic bodies and especially cylindrical bodies of solid or hollow construction in such manner as to uniformly heat the bodies at a rapid rate without, however, overheating or burning portions of the body.

Another object of this invention is to provide an improved apparatus for the heat treatment of metallic bodies of the character described.

These objects and others which will become apparent hereinafter are attained, in accordance with the present invention, with the aid of apparatus that is capable of providing a rapid convective heating of cylindrical blocks or tubes but is free from the disadvantages described above and thus is capable of an optimum heat transfer and uniform temperature distribution of heat treatment of the metallic body. This apparatus comprises, in accordance with an important feature of the present invention, a generally cylindrical heat-treatment chamber coaxial with the cylindrical block or body and receiving same with an annular clearance; a plurality of burners opening into this clearance with burner axes or outlet-orifice axes generally tangential in the same sense to a circle centered on the axis of the block and of the heat-treatment chamber but of a diameter less than that of the block or the tube so that the burners are correspondingly oriented toward the surface of the block to a greater extent than the tangential but less than the radial orientations would comport. More specifically, it can be stated that the axes of the burners, uniformly distributed about the circumference of the cylindrical body and opening into this axially extending annular clearance, should be tangential to a circle centered on the aforementioned axes and having a diameter between 15% and 90% of that of the body while the burner axes, advantageously, include with respective radii of the cylindrical body and heat-treatment chamber, at the respective burner orifice, angles of substantially 10° to 50°.

In a preferred embodiment of the present invention, especially characterized by an improved heat-transfer rate and efficiency, the burners are oriented toward the periphery of the cylindrical body to a greater extent than with a tangential orientation but not quite radially so that the the flame and exhaust gases issuing from the burners form a twisting gas circulation in the annular clearance surrounding the body whereby the gases spiral inwardly and upwardly and thus tend to converge upon the cylindrical body as they sweep therealong to an outlet in the roof of the burner chamber. Advantageously, a circumferential array of equispaced burners is provided in each of a plurality of horizontal planes, the horizontal planes being uniformly spaced in vertical direction, i.e. along the axis of the heat-treatment chamber and the body. At least three such burners are disposed in each horizontal plane. The inwardly spiraling movement of the gases as they pass upwardly in a screw-like or spiroidal configuration ensures that the gases will be at their highest velocity in the region of the surface of the cylindrical body whereby problem-creating boundary layers are destroyed and a uniform heating of the body is ensured. In practice, it is found to be desirable to control the system so that the speed of the gases falls off away from the surface of the body in inverse relationship with the radius of the annular clearance whereby the temperature likewise falls off in proportion to 1/R. It has been discovered that the high-velocity stream of gases flowing around and in contact with the surface of the body ensures the generation of turbulence in the region of the surface of the body and indeed eddy currents and minor vortexes are generated in great numbers, these vortexes ensuring the establishment of an integrated and well-defined cyclonic movement of the gases. It has been found that this arrangement is surprisingly effective in establishing a stable temperature gradient across the clearance and in maintaining the temperature in the region of the surface of the body at a uniform and high level. This is especially the case when the heat-treatment chamber has a diameter approximately twice the diameter of the cylindrical block or tube to be heated and at least the three burners mentioned above are provided in each horizontal plane. Even more surprisingly, it is observed that a combined impact or blast effect and convective or cyclonic heating effect is obtained which results in a heating rate approximately equal to that of regions directly opposite prior radial burners but ensures a uniformity of heating characteristic more pronounced than with conventional convective heating systems.

Figure 2:
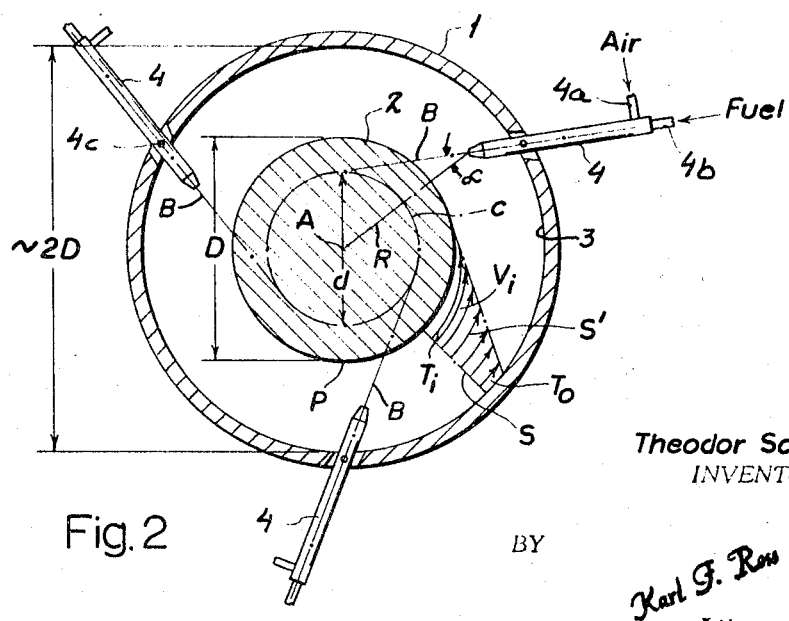

The above and other objects, features and advantages of the present invention will become more readily apparent from the following description, reference being made to the accompanying drawing in which:

FIG. 1 is an axial cross-sectional view taken in a vertical plane through a heat-treatment apparatus in accordance with this invention; and FIG. 2 is a representational horizontal cross-section through the system of FIG. 1.

In FIG. 1 of the drawing, I show a heat-treating apparatus comprising a generally cylindrical shell or housing 1 open at its upper end to a chimney or exhaust duct 5 coaxial with the cylindrical chamber 3 formed by the housing 1. The housing has a vertical axis A and is provided with means M for supporting a cylindrical body 2 to be heated, this body being coaxial with the chamber 3, the housing 1 and the exhaust duct 5. For this purpose, the support M is provided with a centering flange C engaging the body 2. The latter can, according to this invention, be constituted as a solid cylinder, as illustrated in FIGS. 1 and 2, or may be hollow, the body 2 being then a pipe, tube or cylindrical shell. In a plurality of vertically spaced horizontal planes 8', 8'', 8''', I provide circumferential arrays of equispaced burners 4', 4'' and 4''' as illustrated in FIG. 2 for all of the burners which have been designated in this figure by 4. As represented by the dot-dash line G in FIG. 1, the gases generated by the burners 4', 4'', 4''' swirl about the cylindrical body 2 and tend to converge spirally thereupon as they sweep axially upwardly through the chamber and emerge at the exit duct 5. Openings O can be provided in the base of the housing 1 in order to facilitate the generally upward spiroidal drift of the gases.

On referring now to FIG. 2, from which the details of the present invention will become more readily apparent, it will be seen that the essential characteristic of this invention is that the gases and flames from the burners are neither directed against the body 2 in a purely radial manner nor oriented tangentially so as to provide a helical vortex. On the contrary, the burners 4 are oriented with respect to the body 2 so that they are turned toward the latter to a greater extent than would be the result if they were tangential to the periphery of the body or to a circle centered on the axis thereof but of a larger diameter. From FIG. 2 it can be seen that the axis B of each of the burners 4 and thus of the flame and gas blast emerging therefrom impinges partially against the cylindrical periphery P of the body 2 and is tangential to a circle c centered upon the axis of the body and of the chamber 3 but of a diameter $d$ less than the diameter D of the body 2. Thus, at the exit orifice of each burner 4, the axis thereof and of the hot blast therefrom includes an acute angle $\alpha$ with a corresponding radius R of the body 2 intersecting the orifice. The burner 4 can be of any conventional type and is here represented as having an inlet 4a for combustion-sustaining air or other gas and an inlet 4b for the fuel which can be gas, fuel oil or the like. It will be understood, moreover, that burner systems adapted to use combustion air introduced through the openings O may also be employed.

I have found that best results are obtained when the heating chamber 3 in which the metallic body 2 is disposed has a diameter approximately equal to 2D where D, as has been indicated, is the diameter of the body 2. This arrangement ensures that the gases will tend to spiral inwardly, i.e. toward the axis A, as they pass upwardly along the body 2 and therearound. In actual experiment, the body was found to be heated to the desired temperature (in the case of a steel solid cylinder) at a fraction of the time required for the heating when the burners were oriented tangentially and in a completely uniform manner.

When a radial orientation of the burners was employed, spot-heating along surfaces of the body rendered it unusable, according to tests carried out with corresponding burner rates and flame temperatures. It is believed that the present invention is effective as a consequence of the fact that the velocity $V_i$ of the gases along the periphery of the body (as diagrammatically represented by the flow section S via vector arrows S' whose spacing and lengths are intended to indicate respectively the fall-off of temperature and velocity) drops at a rate proportional to 1/R (i.e. is inversely proportional to the distance from the axis A); the temperature $T_i$ is correspondingly higher at the inner zone of the annular chamber 3 and likewise falls off as 1/R to the outer zone $T_o$. The arrows S' also indicate that a spiraling inwardly of the gases tends to occur. The block 2 is, consequently, directly heated by a well-defined and stable vortex which uniformly passes along the periphery P of the body 2 as it sweeps axially toward the outlet 5 which is coaxial with the body and has a diameter of a fraction of that of the body. To accommodate bodies 2 of different diameters and to select the angle $\alpha$ at which each burner 4 is oriented, the burners 4 can be mounted for pivotal movement about vertical pins 4c so that they are swingable in the respective horizontal planes and can be tangential to imaginary cylinders represented by larger or smaller circles $c$. Best results are obtained, however, when the circle $c$ has a diameter $d$ equal to substantially 15% to 90% of the diameter D of the body 2 and, preferably, between 25% and 75% thereof while the angle $\alpha$ ranges between 10° and 50° and preferably between 15° and 45°.

The burners are disposed in a plurality of horizontal planes spaced axially along the body 2, as indicated in FIG. 1, and preferably three such burners are provided at equispaced locations in each horizontal plane.

The invention described and illustrated is believed to admit of many modifications within the ability of persons skilled in the art, all such modifications being considered within the spirit and scope of the appended claims.

I claim:

1. An apparatus for the high-speed heat treatment of a cylindrical axially elongated metallic body, comprising housing means forming a generally cylindrical axially elongated heating chamber having a diameter substantially twice that of said body centered on a substantially vertical axis and coaxially receiving said body while defining therewith an annular clearance between the periphery of said body and the wall of said chamber; a plurality of peripherally equispaced burners disposed at different levels near the wall of said chamber with inwardly trained axes all tangent to an imaginary cylinder which is centered on said axis and has a diameter less than that of said body; and flue means forming an upwardly oriented outlet for combustion gases centered on said axis and having a diameter less than that of said body for inducing a flow of gases spiraling inwardly in said clearance about the periphery of said body at a flow velocity inversely proportional to the distance of the gas flow from said axis of said body and said chamber, said gas passing through said clearance to said outlet.

2. An apparatus as defined in claim 1 wherein said burners form several vertically stacked arrays of three burners each.

3. An apparatus as defined in claim 1 wherein said imaginary cylinder has a diameter equal substantially to 15% to 90% of the diameter of said body, each of said burners having an orifice whose axis includes an angle of substantially 10° to 50° with the radius of said body intersecting said orifice.

References Cited

UNITED STATES PATENTS

| | | | |
|---|---|---|---|
| 2,089,829 | 8/1937 | Ferree | 266—5 |
| 2,296,387 | 9/1942 | Inskeep et al. | 266—5 |
| 2,343,004 | 2/1944 | Elder et al. | 266—5 |
| 2,589,778 | 3/1952 | Corns | 263—5 X |
| 2,822,160 | 2/1958 | Walpole | 263—5 |

FOREIGN PATENTS

| | | |
|---|---|---|
| 1,242,056 | 8/1960 | France. |
| 609,979 | 2/1935 | Germany. |

J. SPENCER OVERHOLSER, Primary Examiner

R. SPENCER ANNEAR, Assistant Examiner

U.S. Cl. X.R.

263—4